Patented Mar. 7, 1939

2,149,926

UNITED STATES PATENT OFFICE 2,149,926

CHLORINATED RUBBER PRODUCT

Joseph Grange Moore, Runcorn, and Leonard Thane Dod, Great Crosby, Liverpool, England, assignors to Imperial Chemical Industries Limited, a corporation of Great Britain No Drawing. Application December 8, 1937, Serial No. 178,824. In Great Britain December 15, 1936

2 Claims. (Cl. 106—23)

This invention relates to novel chlorinated rubber products and to the manufacture thereof.

Many proposals have been made to prepare moulding materials, films and the like, by mixing chlorinated rubber with plasticizers such as tricresylphosphate, dibutyl phthalate and chlorinated hydrocarbons.

It has also been proposed to mix chlorinated rubber and rubber hydrochloride, and to prepare plastic products by mixing an oil with chlorinated rubbers of differing chlorine content. It is, nevertheless, customary to employ in the manufacture of such materials a fully chlorinated product, and to rely upon the use of a considerable proportion of plasticizer to impart softness and pliability to the product. It then frequently happens that the advantages accruing from the non-inflammability and flame resistance of the chlorinated rubber are lost.

This invention has an an object to provide novel compositions of matter containing chlorinated rubber which while having a high enough chlorine content to render them flame resistant are yet elastic and plastic, or which can be made so by the addition of comparatively small amounts of plasticizer. A further object is to devise methods of manufacturing such compositions.

Further objects will appear hereinafter.

These objects are accomplished by the following invention.

We have found that we can make chlorinated rubber products having the above properties if we mix together a fully chlorinated rubber and a partially chlorinated rubber. By a fully chlorinated rubber we mean one containing more than about 55% chlorine, preferably about 65% chlorine, and by partially chlorinated rubber we mean one obtained by treating rubber with chlorine until a product is formed containing not more than about 20% chlorine.

The compositions which are obtained are homogeneous over a very wide range of proportions of the two components, and the chlorine content of the partially chlorinated rubber appears to be without effect on the homogeneity of the compositions; thus, although unvulcanised rubber and fully chlorinated rubber are incompatible, uniform mixtures can be obtained with fully chlorinated rubber and a partially chlorinated rubber containing as little as 2% chlorine A suitable partially chlorinated rubber for many purposes is one containing 6% chlorine.

The preparation of the chlorinated rubber mixtures may be carried out in a very convenient manner by mixing solutions of the individual components in a solvent such as benzene, toluene, or carbon tetrachloride, and then removing the solvent by steam distillation, spray drying or precipitation with methanol. Alternatively the components may be incorporated as solids by mixing on differential rolls or other similar means. Other materials such as fillers, pigments, and plasticizers may also be incorporated in like manner, either simultaneously with the incorporation of the two chief components or subsequently, or one or more of them can be added to either of the chief components before the latter are mixed.

In the first of the above mentioned methods the solutions of the chlorinated rubbers are suitably those obtained directly in the manufacture of the products, i. e. a partially (or highly) chlorinated rubber may be prepared by passing chlorine in a solution of rubber until an amount of chlorine has been absorbed corresponding to the chlorinated rubber which it is proposed to prepare, and then this solution is used either directly, or preferably, after removal of any dissolved hydrochloric acid, in the manufacture of the chlorinated rubber product according to the invention.

With progressive chlorination rubber becomes less and less rubber-like in its properties and is finally a brittle, light coloured solid. Considerable variations are therefore possible in the physical characteristics of a chlorinated rubber-partially chlorinated rubber mix, both by altering the degree of chlorination of the partially chlorinated rubber within the specified limits, and also by altering the proportion of this constituent to the highly chlorinated product which has a more or less fixed degree of chlorination. Thus, with a partially chlorinated rubber containing, say, 6% chlorine, mixtures containing up to about 50% of this constituent still retain to some extent a sticky nature, while the tensile strength of the compositions reaches a maximum when the proportion is about 40%; again, a mixture of one part of partially chlorinated rubber containing 6% chlorine with five parts of a fully chlorinated rubber, is still a brittle solid, but on altering the ratio to 1:2 a slightly elastic tough material is produced which can be rolled into homogeneous thin sheets, while a ratio of 2:1 gives a still softer, slightly tacky and more flexible product.

The following example illustrates but does not limit our invention, all parts being by weight.

Example 7.5 parts of crepe rubber were dissolved in sufficient carbon tetrachloride to give a 2.5% solution, and 1 part of chlorine was gradually passed in at ordinary temperatures while the solution was stirred constantly. Stirring was continued for an hour after introduction of the chlorine has ceased, in order that reaction should be complete. A small sample of the solution was then removed, the chlorinated rubber precipitated from it with methanol and analysed. Its chlorine content was approximately 5%.

To the bulk of the solution was added 60 parts of a 12% solution of fully chlorinated rubber (65% chlorine) in carbon tetrachloride, the two solutions thoroughly mixed, freed from dissolved hydrogen chloride by air blowing and the solvent removed by steam distillation. The wet material was dried on warm rolls, and simultaneously 0.16 parts of an antioxidant phenyl-alpha-naphthylamine were incorporated. The product was a pale, yellow translucent, flexible slightly elastic body containing approximately 35% chlorine.

In addition to the two main constituents, small amounts of a plasticizer such as tricresylphosphate, dibutyl phthalate may be added, though they are normally necessary only to render plastic those compositions with a high total chlorine content; i. e. those with a high proportion of fully chlorinated rubber or those in which the partially chlorinated rubber contains near the maximum amount, e. g. 15-20% chlorine, and does not form the major content of the mix. It may be said that in general, plasticizers are unnecessary if the chlorine content of the mixture of the two components is less than 50%; moreover, when it is desirable to add plasticizers, not more than about 10% is required to impart softness to the products, and frequently 2-3% suffices. Small amounts of stabilizers, e. g. basic materials such as sodium carbonate, zinc oxide, etc. or antioxidants such as phenyl-alpha-naphthylamine may also be added.

The advantages resulting from our invention are well illustrated by a comparison of the mixtures described above with chlorinated rubber products prepared by chlorinating rubber in solution until it has attained a chlorine content equal to the chlorine content of the mixed product. Thus, a chlorinated rubber of 25% chlorine content produced by direct chlorination, is a powdery material obviously quite unsuited for many of the purposes to which a composition of equal average chlorine content and made by mixing 2 parts of the 6% partially chlorinated rubber with 1 part of fully chlorinated rubber, can be applied.

As many apparently widely different embodiments of this invention may be made without departing from the spirit and scope thereof, it is to be understood that we do not limit ourselves to the specific embodiments thereof except as defined in the appended claims.

We claim:

1. A new composition of matter comprising a chlorinated rubber, containing more than 55 per cent of chlorine, in admixture with a chlorinated rubber, containing between 2 and 20 per cent of chlorine.

2. A new composition of matter as claimed in claim 1 in which the total weight of chlorine combined with the rubber amounts to less than 50 per cent of the chlorinated rubber present.

JOSEPH GRANGE MOORE.
LEONARD THANE DOD.